(12) United States Patent
Vickery

(10) Patent No.: US 8,578,891 B2
(45) Date of Patent: Nov. 12, 2013

(54) LICK DETERRENT STRIP

(75) Inventor: Travis Vickery, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 150 days.

(21) Appl. No.: 12/968,638

(22) Filed: Dec. 15, 2010

(65) Prior Publication Data

US 2012/0152182 A1 Jun. 21, 2012

(51) Int. Cl.
A01K 13/00 (2006.01)
(52) U.S. Cl.
USPC .......................................... 119/850; 119/859
(58) Field of Classification Search
USPC .................... 119/814, 822, 850, 859
See application file for complete search history.

(56) References Cited

U.S. PATENT DOCUMENTS

| 4,153,009 | A | * | 5/1979 | Boyle | 119/850 |
|---|---|---|---|---|---|
| 4,969,418 | A | | 11/1990 | Jones | |
| 5,158,039 | A | * | 10/1992 | Clark | 119/712 |
| 5,896,830 | A | * | 4/1999 | Stampe | 119/822 |
| D417,529 | S | | 12/1999 | Stampe | |
| 6,453,850 | B1 | | 9/2002 | Stampe | |
| 6,561,136 | B2 | * | 5/2003 | Kuntz | 119/712 |
| 7,219,627 | B1 | * | 5/2007 | Egloff | 119/859 |
| 7,677,204 | B1 | | 3/2010 | James | |
| 2005/0208250 | A1 | * | 9/2005 | Blank et al. | 428/40.1 |
| 2009/0188440 | A1 | * | 7/2009 | Minick et al. | 119/712 |
| 2009/0188443 | A1 | * | 7/2009 | Minick et al. | 119/822 |
| 2009/0272335 | A1 | | 11/2009 | Cooke, Jr. et al. | |
| 2009/0272336 | A1 | * | 11/2009 | Cooke et al. | 119/850 |
| 2009/0272338 | A1 | | 11/2009 | Cooke, Jr. et al. | |

* cited by examiner

*Primary Examiner* — Rob Swiatek
*Assistant Examiner* — Justin Benedik
(74) *Attorney, Agent, or Firm* — Pitts & Lake, P.C.

(57) ABSTRACT

A lick deterrent strip for deterring an animal from licking a wound is provided. The lick deterrent strip is securable to the animal or a bandage such that the lick deterrent strip is positioned over the wound or near the area of the wound. As used herein, a "wound" refers to an injured area on an animal, including, but not limited to, abscesses, cuts, hot spots, incisions, punctures, sores, and stitches. When secured to the animal, the lick deterrent strip provides an exposed surface with electrically energized contacts arranged on the exposed surface. When a conductive portion of the animal, such as the animal's mouth, is placed in electrical communication with the contacts, the lick deterrent strip provides an electrical stimulus to the animal, which deters the animal from accessing or licking the wound.

20 Claims, 4 Drawing Sheets

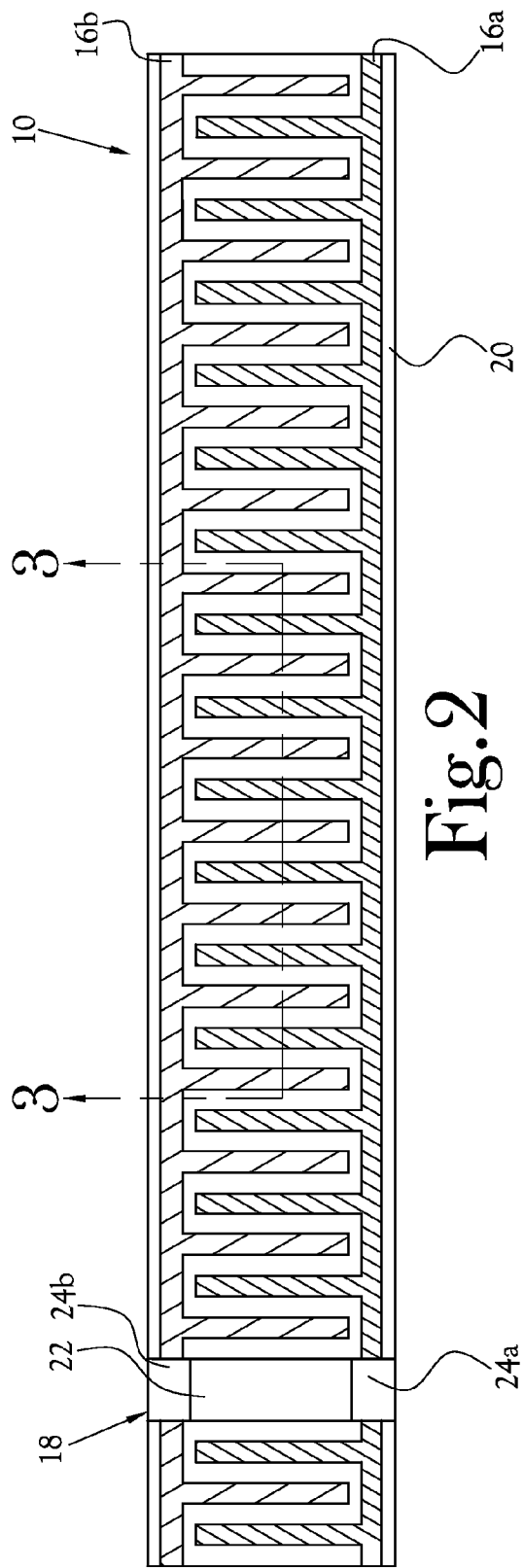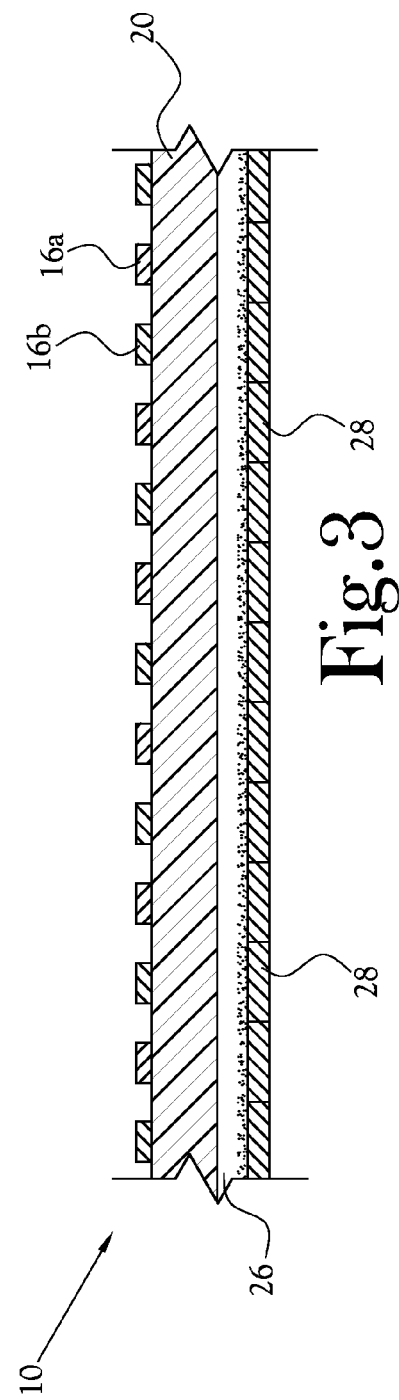

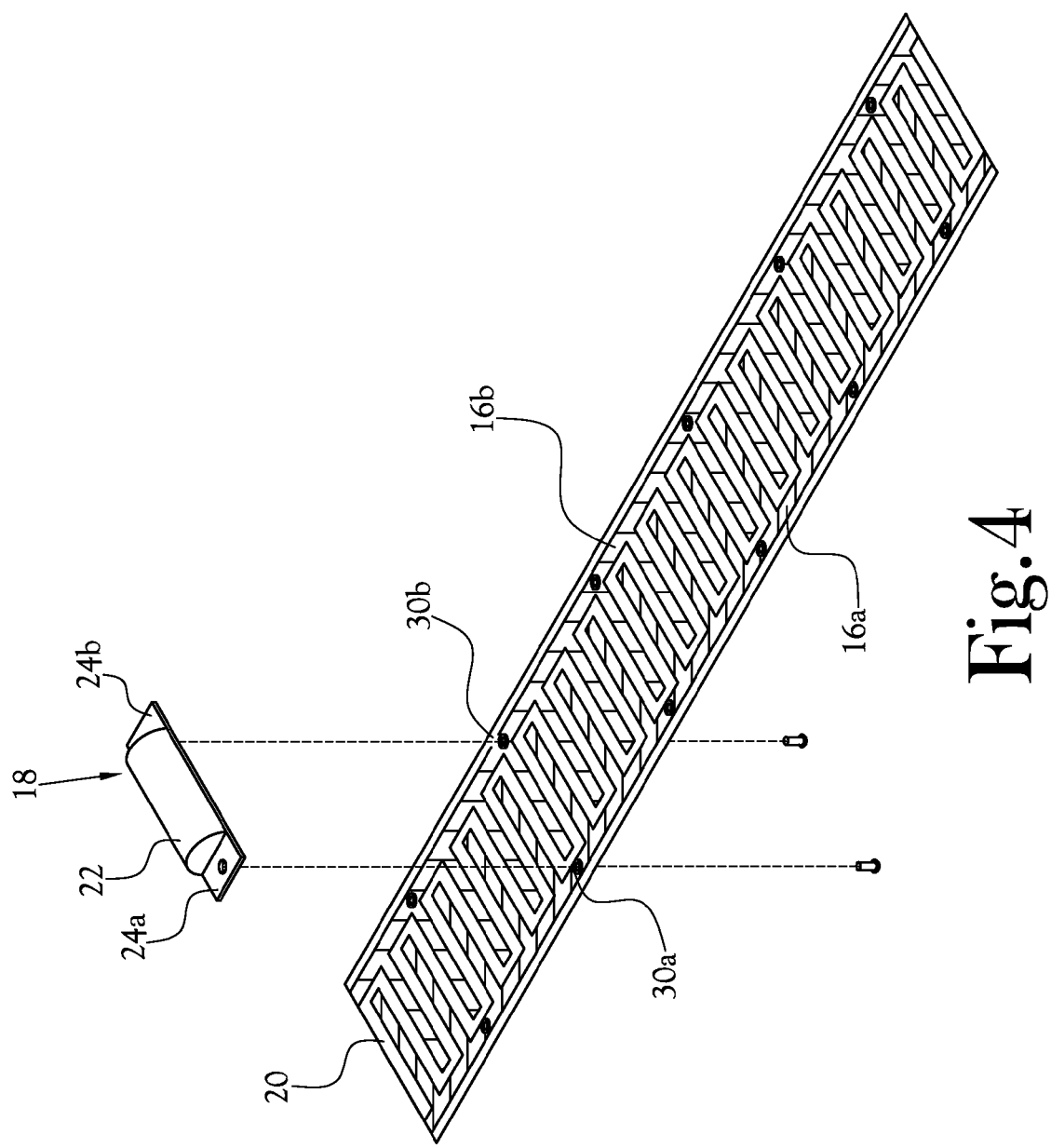

LICK DETERRENT STRIP

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

The invention pertains to a device to deter an animal from licking an area around a wound.

2. Description of the Related Art

Many animals have the tendency to lick a wound, such as a hot spot, sore, cut, stitches, or a blister. Persistent licking of the animal's wound typically contributes to further aggravation of the wound and/or the area near the wound. Accordingly, veterinarians apply and prescribe bandages for treatment of the animal's wounds to aid in preventing infection and any further aggravation of the wound. Unfortunately, the application of a bandage usually does not deter the animal's desire to continue licking the area. As a result, the bandages applied to the animal are frequently damaged or even destroyed from the animal attempting and/or accessing the area of the wound to continue licking.

To prevent damage to the bandages, veterinarians often prescribe an Elizabethan collar, a protective medical device shaped like a truncated cone that is worn around the neck of an animal, to restrict movement of the animal from biting, licking, or scratching it's wounds while they heal. Although Elizabethan collars may prevent damage to some bandages, many animals experience problems with the use of the collars. One common problem is that the Elizabethan collar restricts the animal's peripheral vision, which frequently results in the animal running into objects. Other problems include the animal being unable or refusing to eat and/or drink while wearing the Elizabethan collar.

Other types of animal deterrent devices have been used to prevent the animal from licking wounds, damaging bandages, or chewing on other objects. Typical of the art in this field are static bandages and bitter-tasting spray to deter an animal from licking or chewing.

BRIEF SUMMARY OF THE INVENTION

A lick deterrent strip for deterring an animal from licking a wound is provided. The lick deterrent strip is securable to the animal or a bandage such that the lick deterrent strip is positioned over the wound or near the area of the wound. As used herein, a "wound" refers to an injured area on an animal, including, but not limited to, abscesses, cuts, hot spots, incisions, punctures, sores, and stitches. The lick deterrent strip includes a flexible substrate having electrical contacts routed on a first surface of the flexible substrate and an adhesive layer on a second surface of the flexible substrate. When secured to the animal, the lick deterrent strip provides an exposed surface, namely the first surface, with energized electrical contacts of differing potentials arranged on the exposed surface. When a conductive portion of the animal, such as the animal's mouth, is placed in electrical communication with the electrical contacts, the lick deterrent strip provides an electrical stimulus to the animal, which deters the animal from accessing or licking the wound.

BRIEF DESCRIPTION OF THE SEVERAL VIEWS OF THE DRAWINGS

The above-mentioned features of the invention will become more clearly understood from the following detailed description of the invention read together with the drawings in which:

FIG. 2 illustrates one embodiment of the lick deterrent strip;

FIG. 3 illustrates a sectional view along 3-3 of the lick deterrent strip as depicted in FIG. 2;

FIG. 4 illustrates an exploded view of one embodiment of the lick deterrent strip.

DETAILED DESCRIPTION OF THE INVENTION

A lick deterrent strip for deterring an animal from licking a wound is described in detail herein and shown in the accompanying figures. The lick deterrent strip is securable to the animal or a bandage such that the lick deterrent strip is positioned over the wound or near the area of the wound. As used herein, a "wound" refers to an injured area on an animal, including, but not limited to, abscesses, cuts, hot spots, incisions, punctures, sores, and stitches. When secured to the animal, the lick deterrent strip provides an exposed surface with energized electrical contacts of differing potentials arranged on the exposed surface. When a conductive portion of the animal, such as the animal's mouth, is placed in electrical communication with the electrical contacts, the lick deterrent strip provides an electrical stimulus to the animal, which deters the animal from accessing or licking the wound.

Figure 1:
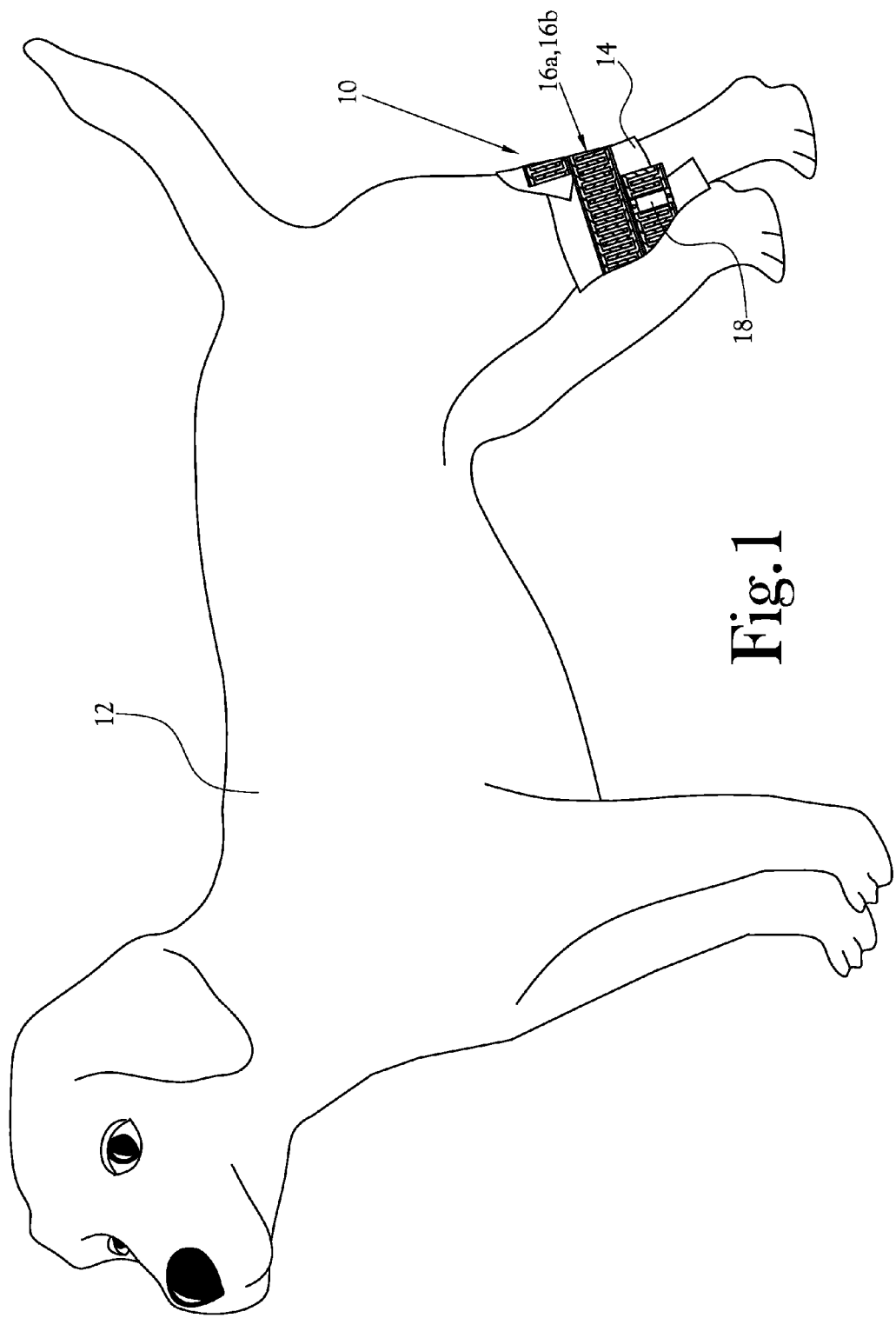
FIG. 1 illustrates one embodiment of a lick deterrent strip secured to an animal.

FIG. 1 illustrates one embodiment of a lick deterrent strip 10 secured to an animal 12. Specifically, the depicted lick deterrent strip 10 is secured to a bandage 14 wrapped around the animal's hind leg. In the illustrated embodiment, the lick deterrent strip 10 is secured to the bandage 14 such that a majority of the bandage 14 is covered. The lick deterrent strip 10 can also be arranged to cover varying amounts of the animal 12 or the bandage 14. As depicted, the exposed surface of the lick deterrent strip 10 provides electrical contacts 16*a*, 16*b* powered by a battery 18. When the animal's nose, mouth, or tongue, is placed in electrical communication with the electrical contacts 16*a*, 16*b*, the lick deterrent strip 10 provides an electrical stimulus to the animal 12, which creates an unpleasant condition to deter the animal 12 from licking without harming the animal 12.

FIG. 2 illustrates a top plan view of one embodiment of the lick deterrent strip 10. The lick deterrent strip 10 includes a flexible substrate 20 fabricated from a material suitable for securing to a portion of the animal or a bandage on the animal. More specifically, the material for the flexible substrate 20 is flexible, and conformable to the contour of the animal, such as the animal's abdomen, body, leg, tail, etc. Additionally, the material is electrically nonconductive such that the electrical contacts 16*a*, 16*b* are electrically isolated from one another. Other considerations for selecting the flexible substrate 20 include, but are not limited to, the overall durability of the material and it's imperviousness to creams, gels, ointments or other types of medications that are applied to the wound. One suitable material for the flexible substrate 20 is a biaxially-oriented polyethylene terephthalate (BoPet) film, such as that marketed under the name Mylar®. In one embodiment, the flexible substrate 20 is transparent, which allows the animal owner or veterinarian to visually observe the placement of the lick deterrent strip 10 over a wound or bandage. In alternate embodiments the lick deterrent strip 10 includes a flexible substrate 20 being opaque, shaded, or a variety of colors.

The lick deterrent strip 10 includes two independent electrical contacts 16a, 16b on a first surface of the flexible substrate 20, which is also the exposed surface when secured to an animal or bandage. The electrical contacts 16a, 16b are embedded or otherwise secured on the flexible substrate 20 such that the electrical contacts 16a, 16b remain affixed if the animal licks, chews, or otherwise attempts to access the area of the lick deterrent strip 10. The electrical contacts 16a, 16b include two or more conductors, such as conductive bars, conductive tape, wires, conductive substances, conductive compounds, and/or combinations thereof. Considerations for selecting the material for the electrical contacts 16a, 16b include, but are not limited to, the materials conductivity, integrity, durability, resistivity, cost of manufacture, and effectiveness of securing to the flexible substrate 20. It should also be noted that selection of the electrical contacts' 16a, 16b resistivity influences the level of stimulus applied to the animal.

In the illustrated embodiment, the electrical contacts 16a, 16b are in the form of conductive traces. In one embodiment, each of the depicted electrically conductive traces 16a, 16b includes a conductive bar disposed on the flexible substrate 20 and a conductive coating covering the conductive bar and partially extending onto the flexible substrate 20. The conductive coating includes electrically conductive substances or compounds having sufficient conductive material to make the compound conductive. For example, in one embodiment, the conductive coating is carbon black having a selected resistivity to produce a stimulus that deters the animal but is not harmful.

The electrically conductive traces 16a, 16b are arranged in a repetitive pattern on flexible substrate 20. In the illustrated embodiment, the lick deterrent strip 10 includes a first electrically conductive trace 16a and a second electrically conductive trace 16b routed in a periodic pattern. The first electrically conductive trace 16a includes a longitudinal portion arranged along a first edge of the flexible substrate 20 and periodically spaced inward portions that extend across the first surface of the flexible substrate 20. The second electrically conductive trace 16b also includes a longitudinal portion arranged along a second edge of the flexible substrate 20 that has periodically spaced inward portions that extend across the first surface of the flexible substrate 20. Moreover, the inward portions of the first electrically conductive trace 16a and the second electrically conductive trace 16b alternate at a spaced relationship along the central area of the flexible substrate 20. The spaced relationship is configured such that a conductive portion of the animal, e.g. nose, mouth, or tongue, is able to make contact between at least two electrically conductive traces 16a, 16b.

Additionally, the electrically conductive traces 16a, 16b are arranged for electrical communication with an attachable power source 18. Specifically, the repetitive pattern of the electrically conductive traces 16a, 16b defines re-occurring positions for placement of the power source 18. Thus, allowing the power source 18 to be attached at multiple locations to the lick deterrent strip 10.

In the illustrated embodiment, a battery 18 is provided as the power source 18 for the lick deterrent strip 10. The battery 18 is chemically or mechanically attached to the flexible substrate 20 by adhesives, clamps, snaps, or other fasteners. In one embodiment, the battery 18 resides in a rigid housing 22, which further provides durability, protection chewing, water protection, and overall weather resistance. When secured to the flexible substrate 20, each electrically conductive trace 16a, 16b is placed in communication with opposing terminals of the battery 18 such that the electrically conductive traces 16a, 16b are at different potentials. Specifically, a first terminal of the battery 18 is in electrical communication with the first electrically conductive trace 16a at a first connection point and a second terminal of the battery 18 is in electrical communication with the second electrically conductive trace 16b at a first connection point. In the illustrated embodiment, the battery 18 is connectable to the first connection point and the second connection point at any position on the electrically conductive traces 16a, 16b. Thus, the depicted lick deterrent strip 10 does not provide specific predetermined connection points for placement of the power source 18.

This allows the power source 18 to be attached to one of a plurality of customizable positions on the lick deterrent strip 10. These customizable positions allow for placement of the power source 18 in view of the particular application, such as the location on the animal and length of the lick deterrent strip 10. For example, the power source 18 is selectably attachable to the lick deterrent strip 10 for the optimal placement on the lick deterrent strip 10 to avoid damage while using less lick deterrent strip 10 overall. In one embodiment, the power source 18 is attached in the middle of the lick deterrent strip 10 such that the lick deterrent strip 10 overlaps the power supply 18 to prevent the animal from damaging the power supply 18.

Furthermore, the illustrated embodiment of the lick deterrent strip further includes terminal connectors 24a, 24b to enhance electrical communication between the power source 18 and the electrically conductive traces 16a, 16b. For example, in one embodiment, the terminal connectors 24a, 24b include small conductive traces or footers that are coupled to the electrically conductive traces 16a, 16b for consistent electrical communication, which further aides in preventing disturbance of the power source 18.

FIG. 3 illustrates a section view along 3-3 of the lick deterrent strip 10 as depicted in FIG. 2. The depicted lick deterrent strip 10 includes a flexible substrate 20 having electrically conductive traces 16a, 16b disposed on a first surface and an adhesive layer 26 residing on a second surface. The adhesive layer 26 is configured for detachably securing to the animal or the bandage. Accordingly, the adhesive layer 26 includes an adhesive suitable for affixing to fur, skin, gauze, or other types of surfaces. Other considerations for selecting an adhesive include, but are not limited to, the adhesiveness when subjected to creams, gels, ointments or other types of medications that are typically applied to the wound.

The lick deterrent strip 10 further includes an adhesive protectant 28 that covers the adhesive layer 26. When the adhesive protectant 28 is removed from the lick deterrent strip 10, the adhesive layer 26 is exposed for attachment to the animal or bandage. Frequently, when attached to and removed from the animal the adhesive layer 26 includes hair, debris, medication, or other contaminants which reduce the adhesiveness of the lick deterrent strip 10 for subsequent use. Accordingly, in the illustrated embodiment, the adhesive protectant 28 is partitioned into multiple sections of adhesive protectant 28. Each section is separately removable to expose a desired amount of adhesive layer 26. For example, in one embodiment, alternating sections of the adhesive protectant 28 are removable such that the lick deterrent strip 10 has sufficient adhesion for attaching to an animal for a first use. When the exposed adhesive layers 26 lose their adhesiveness after one or more uses, the remaining sections of the adhesive protectant 28 are removed to expose the previously covered adhesive layer 26 for continued use of the lick deterrent strip 10.

FIG. 4 illustrates attachment of the power source 18 to an alternate embodiment of a lick deterrent strip 10. The depicted lick deterrent strip 10 includes a plurality of connection points 30a, 30b for the battery 18. Specifically, a first connection point 30a is defined at spaced intervals along the first electrically conductive trace 16a on the flexible substrate 20 and a second connection point 30b is defined at spaced intervals along the second electrically conductive trace 16b on the flexible substrate 20. The spaced intervals are periodically located along the length of the lick deterrent strip 10. In one embodiment, the connection points 30a, 30b are posts which allow the battery housing 22 to snap or clamp into place. In the illustrated embodiment, the connection points 30a, 30b are a series of small holes for securing the battery 18 to a desired set of connection points 30a, 30b. The series of small holes also provide a guide to the animal owner or veterinarian for securing the battery 18. For example, in one embodiment, a desired location is chosen and the battery housing 22 is secured by screws to the flexible substrate 20. The remainder of the small holes, or unused connection points 30a, 30b, allow for circulation of airflow to the underlying area.

Figure 5:
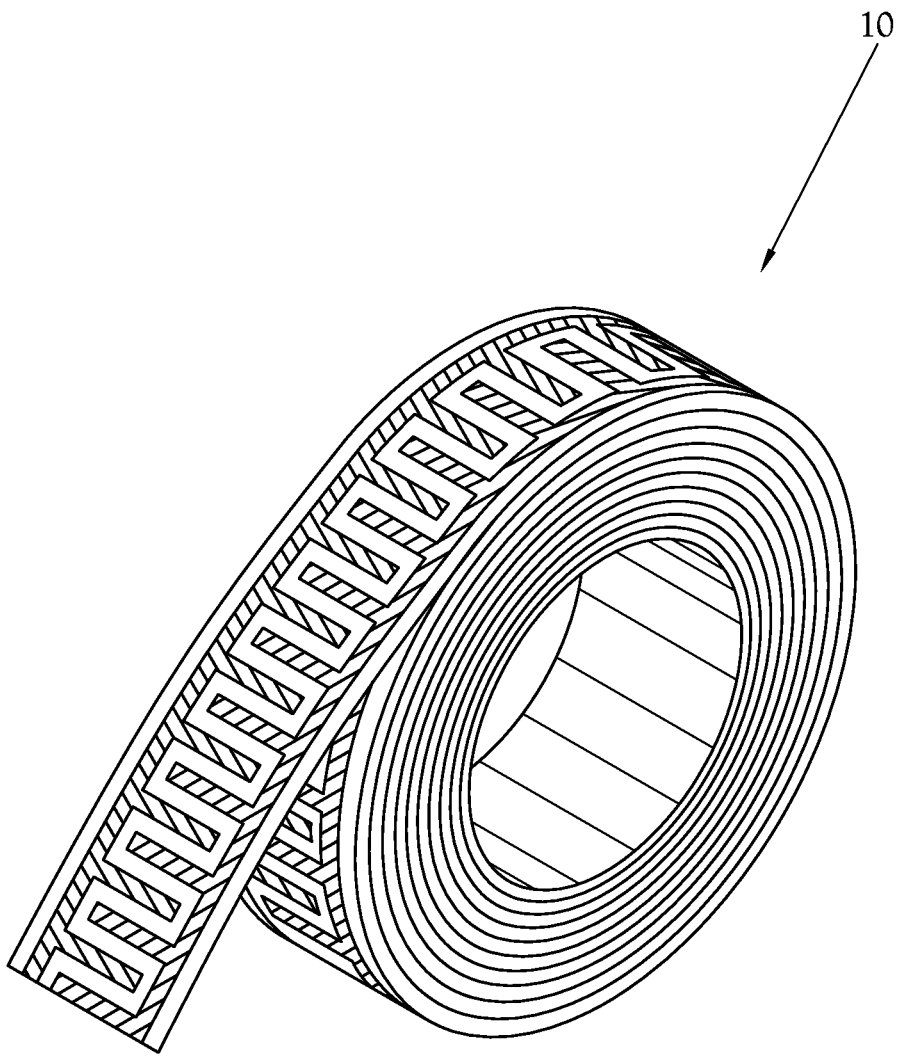
FIG. 5 illustrates one embodiment of the lick deterrent strip provided in a roll.

FIG. 5 illustrates a roll of one embodiment a lick deterrent strip 10. The depicted roll of the lick deterrent strip 10 provides a bulk supply of the lick deterrent strip 10 for multiple applications. Specifically, the bulk supply of the lick deterrent strip 10 allows an animal owner or veterinarian to obtain multiple strips of various sizes by cutting a smaller strip from a portion of the depicted roll. For example, in one embodiment, the lick deterrent strip 10 is provided in a ten foot roll which is divisible into multiple smaller strips of desired lengths. In another embodiment, the lick deterrent strip 10 is provided in predetermined lengths, such as one foot, two feet, etc., which allows for selection of a particular length of lick deterrent strip 10 and, if necessary, cutting the lick deterrent strip 10 to the desired smaller length. Thus, the lick deterrent strip 10 is customizable to a precise length and custom fit for the size and placement on the animal or bandage.

Additionally, in one embodiment, the lick deterrent strip 10 is provided with a readily attachable and detachable battery 18. This allows the lick deterrent strip 10 to be provided in bulk with one or more batteries that can be used on multiple lick deterrent strips 10. In addition to the removable portions of the adhesive protectant 28, the detachable battery 18 prolongs the use that a consumer would get from these lick deterrent strips 10.

In addition to the uses described above, the lick deterrent strip 10 may also be used on other items. For example, in one embodiment, the lick deterrent strip 10 is applied to household items to deter pets from chewing on a particular item, such as a wire, cable, pet bed, door frame, table leg, chair leg, or other furniture. This allows the animal to be trained to avoid the specific item, such as a chair leg, and/or groups of similar items, such as a table legs. The lick deterrent strip 10 does not require additional applications and does not lose its effectiveness to deter the animal.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A lick deterrent strip comprising:
   a substrate;
   a power source;
   a first conductor disposed along a length of the substrate in a first periodic pattern;
   a second conductor disposed along the length of the substrate in a second periodic pattern in spaced relation to the first periodic pattern to define a plurality of re-occurring positions along the length of the substrate such that when the substrate is divided into a plurality of strips of desired length and when the power source is attached to any one of the re-occurring positions at any one of the strips, a potential difference is created across each of the first and second conductors such that an electric stimulus is provided to an animal via the first and second conductors when a conductive portion of the animal contacts the first and second conductors.

2. The lick deterrent strip of claim 1 wherein the substrate includes a first side having the first and second conductors and a second side including an adhesive layer suitable for adhering to an animal.

3. The lick deterrent strip of claim 2 comprising an adhesive protectant adapted to reside on the adhesive layer and protect the adhesive layer, the adhesive protectant being removable from the adhesive layer to expose the adhesive layer for adhering to the animal.

4. The lick deterrent strip of claim 3 wherein the adhesive protectant is partitioned into sections that are separately removable to expose a desired amount of adhesive layer, whereby a first section of the adhesive protectant is removed for a first use and a second section of the adhesive protectant is removed for a subsequent use of the lick deterrent strip.

5. The lick deterrent strip of claim 1 wherein the power source is a battery detachably installable such that a first terminal of the battery is detachably connectable to the first conductor and a second terminal of the battery is detachably connectable to the second conductor.

6. The lick deterrent strip of claim 5 comprising a first terminal connector interposed between the first terminal and the first conductor and a second terminal connector interposed between the second terminal and the second conductor, the first and second terminal connectors enhancing electrical communication between the first and second terminals and the first and second conductors, respectively.

7. The lick deterrent strip of claim 6 wherein the first and second terminals are detachably connectable to the first and second conductors at one of a plurality of re-occurring positions along the first and second conductors, respectively.

8. The lick deterrent strip of claim 7 wherein the plurality of re-occurring positions comprise a series of holes for securing the battery to a desired location on the substrate.

9. The lick deterrent strip of claim 1, wherein the conductive portion is a nose, mouth, or tongue of the animal.

10. A lick deterrent strip comprising:
    a substrate having a length that is sufficient for selectively cutting the substrate into a plurality of sections
    a first conductor disposed along a length of the substrate in a first periodic pattern including a longitudinal portion proximate an edge of the substrate and repetitive inward portions that extend across the substrate;

a second conductor disposed along the length of the substrate in a second periodic pattern in spaced relation to the first periodic pattern, the second periodic pattern including a longitudinal portion proximate an second edge that opposes the first edge of the substrate and repetitive inward portions that extend across the substrate such that the first and second conductors alternate across the surface of the substrate; and a power source detachably installable at any one of a plurality of re-occurring positions at any one of the plurality of sections along the length of the substrate to create a potential difference across each of the first and second conductors such that when the power source is installed at any one of the re-occurring positions and a conductive portion of an animal contacts the first and second conductors, an electric stimulus is provided from the power source to the animal via the first and second conductors.

11. The lick deterrent strip of claim 10 wherein the power source is a battery detachably installable such that a first terminal of the battery is in electrical communication with the first conductor at a first connection point and a second terminal of the battery is in electrical communication with the second conductor at a second connection point.

12. The lick deterrent strip of claim 11 wherein the first connection point is defined at spaced intervals along the first conductor and the second connection point is defined at spaced intervals along the second conductor.

13. A lick deterrent strip comprising:
a substrate having a length that is sufficient for selectively cutting the substrate into a plurality of sections, each section defining a lick deterrent strip having a selected length;
a power source;
a first conductor disposed along the length of the substrate in a first periodic pattern;
a second conductor disposed along the length of the substrate in a second periodic pattern in spaced relation to the first periodic pattern to define a plurality of re-occurring positions along the length of the substrate such that when the power source is attached to any one of the re-occurring positions at any one of the sections, a potential difference is created across each of the first and second conductors such that an electric stimulus is provided to an animal via the first and second conductors when a conductive portion of the animal contacts the first and second conductors.

14. The lick deterrent strip of claim 13 wherein the substrate includes a first side having the first and second conductors and a second side including an adhesive layer suitable for adhering to an animal.

15. The lick deterrent strip of claim 14 comprising an adhesive protectant adapted to reside on the adhesive layer and protect the adhesive layer, the adhesive protectant being removable from the adhesive layer to expose the adhesive layer for adhering to the animal.

16. The lick deterrent strip of claim 15 wherein the adhesive protectant is partitioned into sections that are separately removable to expose a desired amount of adhesive layer, whereby a first section of the adhesive protectant is removed for a first use and a second section of the adhesive protectant is removed for a subsequent use of the lick deterrent strip.

17. The lick deterrent strip of claim 13 wherein the power source is a battery detachably installable such that a first terminal of the battery is detachably connectable to the first conductor and a second terminal of the battery is detachably connectable to the second conductor.

18. The lick deterrent strip of claim 17 wherein the first terminal is detachably connectable to the first conductor at a first connection point and the second terminal is detachably connectable to the second conductor at a second connection point.

19. The lick deterrent strip of claim 18 wherein the first connection point is defined at spaced intervals along the first conductor and the second connection point is defined at spaced intervals along the second conductor.

20. The lick deterrent strip of claim 19 wherein the first connection point and the second connection point are a series of small holes for securing the battery to a desired set of connection points.

* * * * *